(12) United States Patent
Kujawa

(10) Patent No.: US 6,473,977 B1
(45) Date of Patent: Nov. 5, 2002

(54) EYEGLASS FRAME AND LENS TRACING APPARATUS AND METHOD

(75) Inventor: S. Kim Kujawa, Regina (CA)

(73) Assignee: Elision Technology Inc., Regina (CA)

( * ) Notice: Subject to any disclaimer, the term of this patent is extended or adjusted under 35 U.S.C. 154(b) by 96 days.

(21) Appl. No.: 09/666,078

(22) Filed: Sep. 21, 2000

(30) Foreign Application Priority Data

Sep. 23, 1999 (CA) .............................................. 2283495

(51) Int. Cl.⁷ .............................. G01B 5/20; G01B 7/28
(52) U.S. Cl. ................................ 33/28; 33/200; 33/507
(58) Field of Search ............................. 33/28, 200, 507

(56) References Cited

U.S. PATENT DOCUMENTS

| | | |
|---|---|---|
| 4,912,880 A | 4/1990 | Haddock et al. |
| 4,995,170 A * | 2/1991 | Brule et al. .................... 33/200 |
| 5,121,548 A * | 6/1992 | Daboudet et al. ............. 33/200 |
| 5,121,550 A * | 6/1992 | Wood et al. ................... 33/200 |
| 5,138,770 A | 8/1992 | Matsuyama .................... 33/28 |
| 5,228,242 A | 7/1993 | Matsuyama |
| 5,333,412 A | 8/1994 | Matsuyama |
| 5,347,762 A | 9/1994 | Shibata et al. |
| 5,515,612 A * | 5/1996 | Igarashi et al. ................ 33/200 |
| 5,845,408 A | 12/1998 | Chansavoir et al. .......... 33/200 |
| 6,035,538 A * | 3/2000 | Miralles Bielsa et al. ..... 33/200 |
| 6,263,583 B1 * | 7/2001 | Mizuno ........................ 33/200 |

* cited by examiner

Primary Examiner—Christopher W. Fulton
(74) Attorney, Agent, or Firm—Blake, Cassels & Graydon LLP; Terry L. Leier

(57) ABSTRACT

Apparatus for tracing the perimeter shape of the lens holding aperture of an eyeglass frame, or an eyeglass lens, includes a holder to releasably hold an eyeglass frame or lens for tracing measurement. A tracing stylus has a 3 axis movement control apparatus to move the stylus around an axis of rotation and in a vertical and a horizontal direction of a plane rotatable about the axis of rotation. The stylus is urged into horizontal contact with the frame or lens to be traced by a horizontal axis motor dynamically controlled to optimize the contact force between the tracing stylus and frame or lens during the trace process. Control of the vertical movement axis of the stylus optimally provides a weightless behaviour of the stylus permitting it to move vertically responsive to external vertical forces.

19 Claims, 7 Drawing Sheets

EYEGLASS FRAME AND LENS TRACING APPARATUS AND METHOD

This invention relates to a computerised tracing apparatus used to trace the perimeter of eyeglass frames and lenses to determine the shape of the lenses or frames.

BACKGROUND TO THE INVENTION

Eyeglass frames are produced in a wide variety of shapes depending on the design of the frames. The corresponding eyeglass or ophthalmic lenses that will be mounted in the eyeglass frames must be shaped to have a conforming perimeter corresponding to the frame into which they will be mounted.

Generally, ophthalmic lenses are produced with various optical correction factors and have a uniform perimeter shape when produced and are termed lens blanks. A person will select the eyeglass frame most pleasing to him or her and, typically, it is the function of an optical dispensary to shape the lenses blanks to conform or fit into the particular selected eyeglass frame. Once the lens blanks have been shaped, they are mounted in the eyeglass frame and ready to wear.

In the past, the lens grinders which are used to grind the lens blanks include those that are controlled by mechanical patterns which produce perimeter shapes on the lens blanks that correspond to the eyeglass frames into which the shaped lens blanks produced from the lens blanks are to be mounted. An inventory of these mechanical patterns is used to control the grinding process to shape the lens blanks to the desired perimeter shapes.

More recently, computer controlled grinders have been employed to grind a lens blank periphery into the desired shape, as shown for example, in my corresponding U.S. Pat. No. 5,683,288. For computer controlled grinders, it is preferable to have digital encoders to trace the perimeter shape of an eyeglass frame or lens to enable further lens blanks to be shaped to a corresponding perimeter shape quickly and expediently. Such digital encoders can be referred to as patternless tracers and a number of devices to trace or digitally encode the perimeter shape of an eyeglass lens or frame have been proposed. The patternless tracers trace the periphery of a lens or eyeglass frame to produce a data set representative of the shape of the lens or frame which has been traced. An example of a digital encoder or patternless tracer of this type is found in U.S. Pat. No. 5,333,412 to Matsuyama for apparatus and method of obtaining processing information for fitting lenses in eyeglass frames and an eyeglass grinding machine. Another computerised edge tracing system is disclosed in U.S. Pat. No. 4,912,880 to Haddock et al.

Due to the varying types of designs of eyeglass frames, including both the shape of the lens mounting portion of the frames as well as the variety of materials from which the frames are constructed, it is desirable to have a frame tracer which can trace a wide variety of shapes of lenses to accommodate the wide variety of eyeglass frame materials of the products that are available in the marketplace. Moreover, it is desirable to have a lens tracer system which allows the eyeglass frames to be mounted in a simple structure which requires a minimum of operator set-up before the eyeglass frames, lenses or patterns which are to be traced can be traced by the tracing machine.

In this regard, it is desirable to have a frame lens tracer system in which the frame or lens to be traced can be mounted without manipulation or adjustment of numerous clamps or settings or other mechanical devices to "center" the frame or lens in the holding mechanism of the tracer. Moreover, it is desirable to have a tracer which can be used to trace a wide variety of materials such as wire frames and plastic frames. Preferably, the tracers should be capable of tracing any arbitrary eyeglass frame or lens peripheral shape including edges that provide varying radii of curvature from a very large radius of curvature of a smooth arc to a very small radius of curvature of a sharp arc or cusp. It is preferable that the tracer apparatus not deflect or deform the frames during tracing, which can result in errors in the tracing readings produced by the tracer. Moreover, the tracer apparatus should not bind on or come free of the edge which is being traced as these conditions result in errors in the tracing readings produced by the tracer.

SUMMARY OF THE INVENTION

In one of its aspects, the invention provides apparatus to trace the perimeter shape of an eyeglass frame or lens comprising a base including holding means and a stylus. The apparatus includes rotation means operable to rotate said stylus relative to said base and rotation encoder means to provide signalling representative of relative rotation between said stylus and said base, and horizontal movement means operable to move said stylus horizontally relative to said base including horizontal movement encoder means to provide signalling representative of relative horizontal displacement between said stylus and said base. The apparatus has vertical movement means operable to move said stylus vertically relative to said base and vertical movement encoder means to provide signalling representative of relative vertical displacement between said stylus and said base. Whereby the stylus can trace the perimeter of an eyeglass frame or lens held by said holding means.

In another of its aspects, the invention provides an apparatus to trace the perimeter shape of an eyeglass object, namely a frame or a lens, comprising a base and means to hold an eyeglass object to the base. The apparatus further includes a stylus to contact the eyeglass object and actuator means operable to displace the stylus with respect to the base in three directions, namely rotationally about a pivot point, horizontally and vertically. The apparatus also includes encoder means to produce signalling representative of the rotational, horizontal and vertical displacement of said stylus with respect to the base and control means to activate the actuator means to control the rotational, horizontal and vertical displacement of the stylus whereby the stylus is displaced to trace the perimeter of the eyeglass object and the position of the stylus during said trace is signalled by the encoder means.

In yet another embodiment, the invention includes a method of tracing the perimeter shape of an eyeglass frame or lens comprising the steps of releasably securing an eyeglass object, namely a frame or lens, to a base and biasing a stylus into contact with said eyeglass object. The method provides for rotating the stylus substantially one revolution about a pivot point with respect to the base and encoding the vertical, horizontal and rotational displacement of the stylus at discreet intervals during the revolution.

And in yet another embodiment, the invention provides a method for seating alignment of apparatus to trace the perimeter shape of an eyeglass frame that includes a base, means to hold an eyeglass frame to the base, a stylus having a pointed projection to contact the eyeglass frame, actuator means operable to displace the stylus with respect to said base in at least two directions, namely, horizontally and vertically, comprising attempting seating alignment until seating of the pointed projection of the stylus in a lens seating groove of an eyeglass frame occurs or a predetermined number of attempts were not successful, each attempt including the steps of homing the stylus to a start position at a selected vertical displacement location and horizontal displacement location. The method further includes moving the stylus horizontally outwardly to an end position and adjusting the vertical displacement location of the start position of the stylus by determining the change in vertical displacement of the stylus at the end position and, for an increase in vertical displacement of the stylus, decreasing the vertical displacement location of the start position of the stylus; but for no increase in vertical displacement of the stylus, increasing the vertical displacement location of the start position of the stylus.

The preferred embodiments of the invention will now be described with reference to the attached drawings which are briefly described as follows.

BRIEF DESCRIPTION OF THE DRAWINGS

FIG. 2 is a plan view of an eyeglass frame with a tracing stylus positioned therein.

FIG. 2a is a cross-section of a portion of FIG. 2 of an eyeglass frame showing the tracing stylus positioned therein.

FIG. 3 is a plan view of an eyeglass lens with a tracing stylus positioned therebeside.

FIG. 3a is a cross-section of a portion of FIG. 3 of an eyeglass lens showing a tracing stylus positioned therebeside.

DESCRIPTION OF THE PREFERRED EMBODIMENTS OF THE INVENTION

Figure 1:
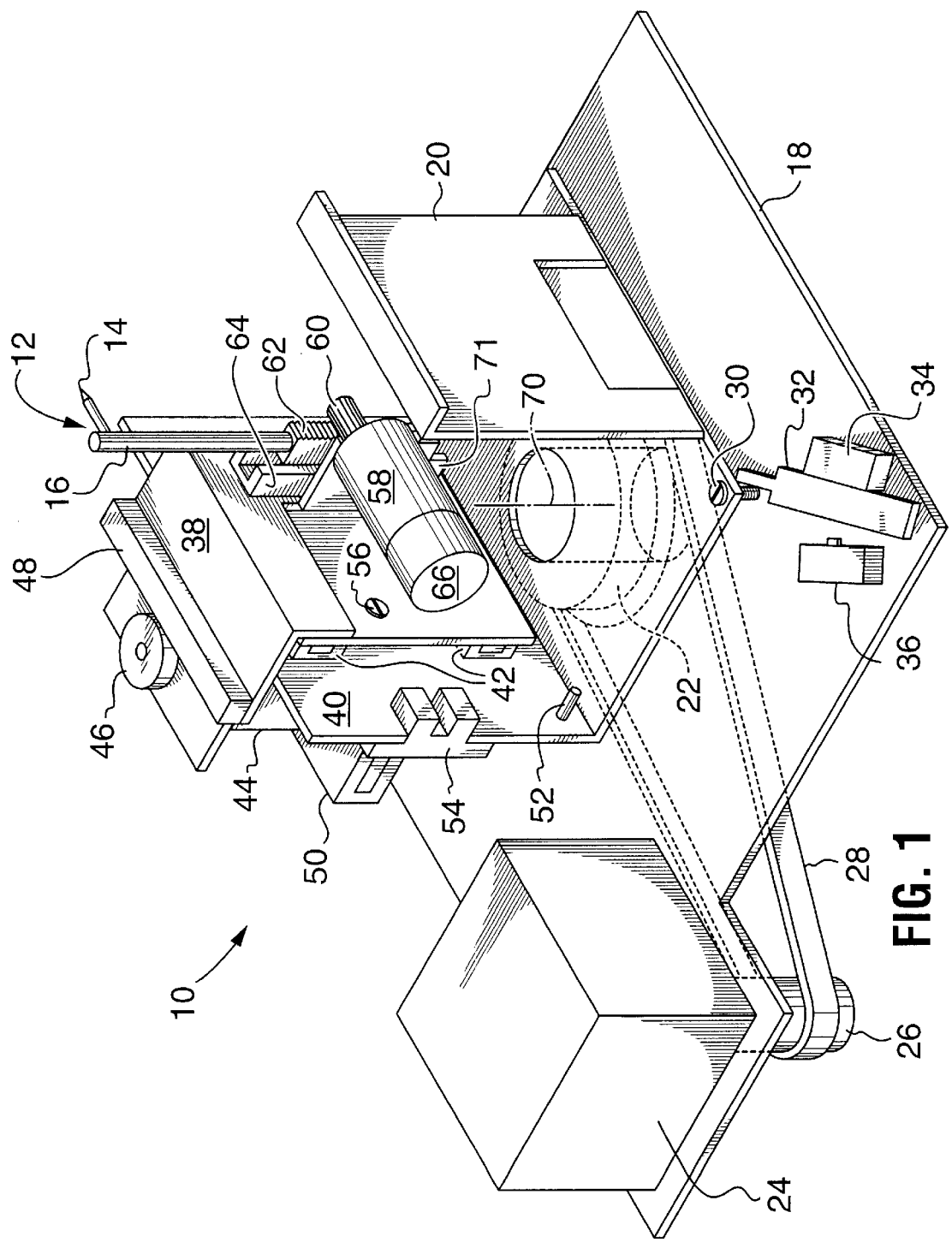
FIG. 1 is a perspective view of the preferred embodiment of a stylus actuator of the invention.

FIG. 1 shows a perspective view of a preferred embodiment of a tracer stylus actuator apparatus depicted generally by reference number 10. Apparatus 10 positions stylus 12 at desired points in 3-dimensional space and produces the coordinates of the position of stylus 12 to enable the spatial location of either the end point 14 of the stylus 12 or the backside 16 of stylus 12 to be determined.

The stylus actuator 10 is mounted on a base 18 which remains stationary. Rotatably connected to base 18 is an intermediate frame or turntable 20 by means of a pulley and bearing assembly 22. The rotation of intermediate frame or turntable 20 with respect to base 18 around pulley and bearing assembly 22 is controlled by rotation motor 24 which drives pulley 26 connected to bearing and pulley assembly 22 by means of a belt 28. The rotation motor 24 preferably is a stepper motor. Using a stepper motor allows the control of the rotation effected by rotation motor 24 by discrete rotational steps thereby controlling the exact rotational displacement of intermediate frame 20 with respect to base 18. At each discrete rotational step, a microprocessor process can be initiated to obtain position coordinates from position transducers to locate the position of stylus 12. The limits of rotation of intermediate frame 20 can be sensed by means of a stop 30 acting on switch actuator 32. In the position of intermediate frame 20 shown in FIG. 1, further counterclockwise movement of intermediate frame 20 is not possible as stop 30 has activated switch activator 32 to contact the counterclockwise limit switch 34. From this position, clockwise rotation of intermediate frame 20 through an entire revolution, including some overlap, will cause stop 30 to contact switch actuator 32 from the side opposite that shown in FIG. 1 to urge switch actuator 32 into contact with the clockwise limit switch 36. Conversely, from this position, the rotation of intermediate frame 20 with respect to base 18 through one revolution, including some overlap, is precisely controlled by means of stepper motor 24.

The rotational orientation of intermediate frame 20 with respect to base 18 is preferably limited at at least one of fixed positions to enable the rotation to be set to a predetermined start or home position. In the preferred embodiment, two fixed positions are provided, namely the extreme counterclockwise orientation as depicted in FIG. 1 where stop 30 pushes switch activator 32 into contact with the counterclockwise limit switch 34. When counterclockwise limit switch 34 is activated, the extreme counterclockwise orientation of intermediate frame or turntable 20 with respect to base 18 is signalled. Another rotational limit of intermediate frame 20 with respect to base 18 occurs when clockwise rotation of intermediate frame or turntable 20 causes stop 30 to push switch activator 32 into contact with the clockwise limit switch 36. The extreme counterclockwise position of intermediate frame 20 with respect to base 18, namely the position depicted in FIG. 1, is used as the "home" position of the base. Each trace of an eyeglass frame or lens by the apparatus commences with the intermediate frame 20 positioned in its home position. Once a trace has been completed the intermediate frame 20 is rotated in reverse to the trace rotation to the position intermediate frame 20 to its home position.

Slidably mounted on intermediate frame or turntable 20 is a horizontal slide assembly 38 which is displaced laterally, under motor control, with respect to upright 40 of intermediate frame 20 during the tracing process. The lateral or horizontal displacement of horizontal slide assembly 38 with respect to upright 40 causes the stylus 12 to be displaced horizontally with respect to base 18 and radially with respect to the axis of rotation 70 of the turntable 20. The configuration of intermediate frame 20 and horizontal slide assembly 38 is preferably arranged such that the endpoint 14 of stylus 12 traverses a radius extending from rotational axis 70 of turntable 20.

Horizontal slide bearings 42 provide a slider bearing mechanism to allow the horizontal slide assembly 38 to move laterally or horizontally with respect to the upright 40. The horizontal slide assembly 38 is driven in horizontal displacement with respect to upright 40 by means of a horizontal drive motor 44 which drives pinion gear 46 that is coupled to gear rack 48. A horizontal encoder 50 is provided to produce position encoding signalling which can be used to determine location information representative of the displacement of horizontal slide assembly 38 with respect to upright 40. This position encoding signalling is preferably also used in the closed loop control of horizontal motor 44 as well as to determine the position of stylus 12 and in turn the position of stylus endpoint 14 or stylus backside 16 as stylus 12 moves with respect to rotational axis 70. To constrain the physical displacement of horizontal slide assembly 38 with respect to upright 40 a stop 52 is provided. The stop 52 on upright 40 comes into contact with the horizontal slide assembly 38 to prevent it from being displaced any further with respect to upright 40. Electrical signalling to represent the extreme lateral or horizontal displacement of the horizontal slide assembly 38 with respect to upright 40 is produced by including a horizontal switch 54 and a horizontal switch actuator 56. When horizontal slide assembly 38 is moved laterally in the leftward direction of FIG. 1, horizontal switch actuator 56 is positioned within horizontal switch 54 and an electrical signalling is produced indicating that the horizontal slide assembly 38 has reached a lateral maximum displacement. The electrical signalling produced by horizontal switch 54 indicates that the horizontal slide assembly 38 is positioned at its start or home position.

Vertical movement of stylus 12 with respect to base 18 under motor control is also provided. A vertical drive motor 58 drives pinion 60 which engages rack 62 whereby rotation of pinion 60 causes rack 62, to which stylus 12 is connected, to be displaced vertically with respect to base 18. A vertical slide bearing 64 guides stylus 12 in its upward and downward vertical displacement. A vertical encoder 66 is integrally mounted on vertical drive motor 58 to provide signalling representing rotational displacement of motor 58 thereby to determine the vertical displacement of stylus 12 with respect to base 18. The fully lowered position of stylus 12 is signalled by vertical switch 71 which is activated when the stylus 12 has been lowered to its lowest, or home, position. Electrical motors including integrally mounted displacement encoders such as those that are used as the horizontal drive motor 44 or the vertical drive motor 58 are available in the marketplace, for example, the electrical motor products available from Micro Mo Electronics, Inc. of Clearwater, Fla., U.S.A.

To effect a trace, the turntable 20 is rotated about its axis of rotation 70 until switch actuator 32 comes into contact with the home switch, for example, the counterclockwise limit switch 34. The rotation drive motor 24 is operated to turn turntable 20 through a complete rotation, including some overlap, until the access limit switch for the clockwise rotation 36 is activated. To trace an eyeglass frame, the turntable 20 is rotated through a revolution, while horizontal drive motor 44 is operated to urge stylus tip 25 outwardly to come into contact with the frame to be traced. To trace an eyeglass lens or pattern, the turntable 20 is rotated through a revolution, while horizontal drive motor 44 is operated to urge stylus tip 25 inwardly to come into contact with the lens or pattern to be traced. During the trace process, the horizontal displacement and force applied to the stylus 12 are controlled by the manner in which horizontal drive motor 44 is operated to provide a varying stylus force applied to the stylus 12.

Figure 2B:
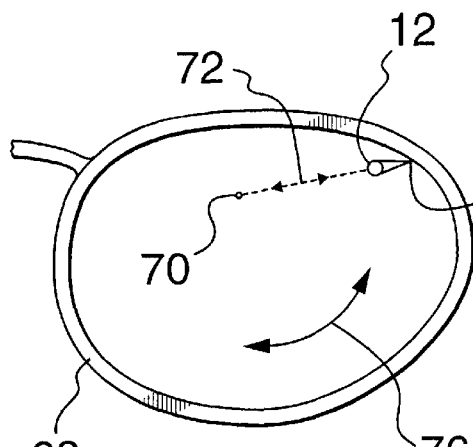
FIG. 2b is a force vector depiction of FIG. 2 of an eyeglass frame with a tracing stylus positioned therein.
Figure 2B:
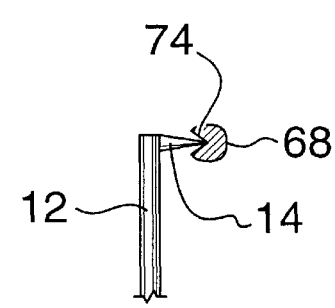
Figure 2B:
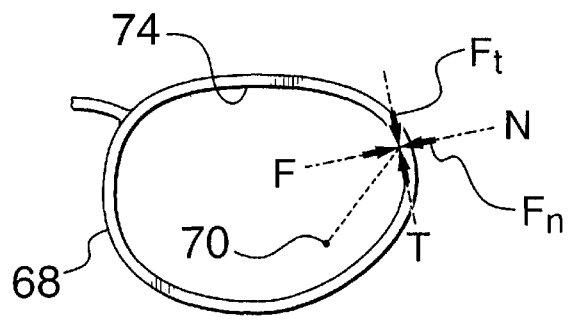

FIG. 2 shows a portion of an eyeglass frame 68 with stylus 12 positioned relative to frame 68 such that the stylus end point 14 is in contact with the interior surface of the lens holding portion of eyeglass frame 68. During the tracing process, the eyeglass frame 68 is held stationary relative to base 18. Pivot point 70 is the axis of rotation of turntable 20 and the dotted line coextending with double-headed arrow 72 represents the horizontal path of travel of stylus 12 with respect to pivot point 70 as the horizontal slide assembly 38 is moved horizontally or radially with respect to turntable 20. When horizontal slide assembly 38 is urged radially outwardly, the stylus end point 14 comes into contact with the eyeglass frame 68. FIG. 2a shows a cross-section of the eyeglass frame 68, which generally has a v-groove 74 into which the lens to be mounted in the eyeglass frame 68 is held. The v-groove 74 provides the surface that stylus end point 14 traces along. The trace operation is effected by rotating turntable 20 about its axis of rotation of pivot point 70. During rotation of the turntable 20, the stylus 12 is circumferentially displaced around the interior surface of the eyeglass frame 68 as it traces a path in the v-groove 74 formed in the interior portion of eyeglass frames 68. The direction of rotation of turntable 20 may be either clockwise, or counterclockwise as indicated by doubleheaded arrow 76.

During the eyeglass frame tracing process, the contact between stylus tip 14 and the surface formed by v-groove 74 of eyeglass frame 68 will result in forces developing between the stylus end point 14 and the eyeglass frame 68. As shown in FIG. 2b, the outward urging contact force on the stylus tip 14 can be depicted as a force of the direction and magnitude depicted as the vector labelled F in FIG. 2b. The interior surface of the v-groove 74 defines a path and the contact force of the end point of the stylus tip 14 and the surface of the eyeglass frame in v-groove 74 produces a reactionary force in the eyeglass frame 68. The reactionary force may be represented by two orthogonal vectors, namely, $F_t$ representing the force tangential to the eyeglass frame surface along axis T and a normal force $F_n$ orthogonal or perpendicular to the eyeglass frame surface along axis N. It is preferable that the normal ($F_n$) and tangential ($F_t$) forces be kept to a minimum to avoid stylus tip 14 from deflecting the shape of eyeglass frame 68 thereby producing erroneous measurements. Moreover, it is desirable to keep the forces $F_n$ and $F_t$ to a minimum to prevent the stylus tip 14 from binding on the surface of the eyeglass frame 68 which is being traced. In addition, the force F must be sufficiently large to ensure that the stylus end 14 remains in contact with the v-groove of the lens holding portion of the eyeglass frame 68 during the tracing process.

The reaction forces $F_n$ and $F_t$ depend on the force F applied to the stylus 12 principally by the horizontal displacement motor 44 operating through the horizontal rack 46 and pinion 48 gearing mechanism to cause the horizontal slide assembly 38 to urge stylus 12 radially outwardly during the eyeglass frame tracing process. The relative sizes of the forces $F_n$ and $F_t$ will depend on the tracing rate, including the rate of rotation that stylus 12 undergoes as it traces the interior surface of the v-groove 74 of the lens holding portion of the eyeglass frame 68. The forces $F_n$ and $F_t$ also depend on the peripheral shape and curves of the eyeglass frame 74 and the relative location of the rotation pivot point 70. In accordance with the preferred embodiment of the invention, it is preferable to control the magnitude of the force F applied to the stylus tip 14 during the tracing process through control of the horizontal motor 44 to minimize eyeglass frame deflection and stylus end point binding.

Figure 3B:
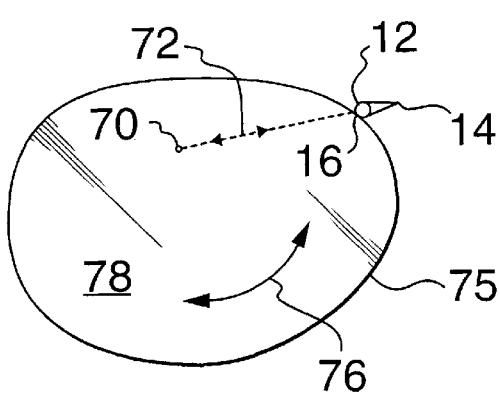
FIG. 3b is a force vector depiction of FIG. 3 of an eyeglass lens with a tracing stylus positioned therebeside.
Figure 3B:
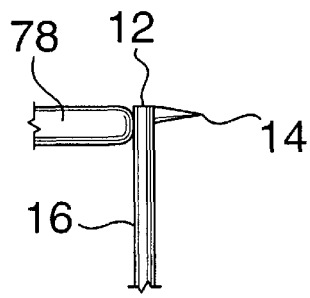
Figure 3B:
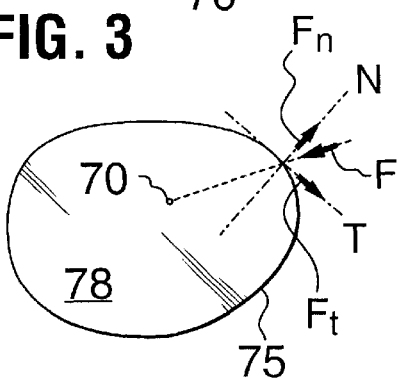

FIG. 3 shows the orientation of the stylus 12 when used to trace an eyeglass lens 78. Preferably, the back surface 16 of the stylus 12 opposed to end point 14 is used to trace an eyeglass lens or lens pattern to serve as a lens tracing stylus, the back surface preferably has a circular cross-section, however, other cross sectional shapes may be used, for example a triangular or pointed cross section. The back surface 16 of the stylus 12 comes into contact with the perimeter surface 75 of the eyeglass lens or lens pattern 78.

When tracing a lens 78, the force applied to the stylus 12 is now directed radially inwardly, to urge the stylus 12 radially inwardly toward pivot point 70. During the tracing process, the lens 78 is held stationary relative to base 18. Pivot point 70 is the axis of rotation of turntable 20 and the dotted line coextending with double-headed arrow 72 represents the path of travel of stylus 12 with respect to pivot point 70 as the horizontal slide assembly 38 is moved horizontally or radially with respect to turntable 20. When horizontal slide assembly 38 is urged radially inwardly, the stylus backside 16 comes into contact with the perimeter 75 of the lens 78. FIG. 3a shows a cross-section of a portion of the lens 78, which typically has a bevelled profile to mate with the v-groove of an eyeglass frame into which the lens is mounted. The bevelled profile is the surface that stylus backside 16 traces along. The trace operation is effected by rotating turntable 20 about its axis of rotation, namely, pivot point 70. During rotation of the turntable 20, the stylus 12 is circumferentially displaced around the exterior perimeter surface of the lens 78 as it traces a path. The direction of rotation of turntable 20 may be either clockwise, or counter-clockwise as indicated by double-headed arrow 76.

During the lens (or lens pattern) tracing process, the contact between stylus backside 16 and the lens perimeter surface 75 will result in forces developing between the stylus 12 and the lens 78. As shown in FIG. 3b, the inward urging contact force on the stylus 12 is depicted as a force of the direction and magnitude depicted as the vector labelled F in FIG. 3b. The lens exterior surface 75 defines a path and the contact force of the stylus backside 16 and the perimeter surface of the lens 75 produces a reactionary force in the lens. The reactionary force may be represented by two orthogonal vectors, namely, $F_t$ representing the force tangential to the lens perimeter surface 75 along axis T and a normal force $F_n$ orthogonal or perpendicular to the lens perimeter surface 75 along axis N. The force F must be sufficiently large to ensure that the stylus backside 16 remains in contact with the lens perimeter surface 75 during the tracing process. In addition It is preferable that the normal ($F_n$) and tangential ($F_t$) forces be kept to a minimum to avoid the stylus 12 from deflecting the lens in its holder producing erroneous measurements.

The reaction forces $F_n$ and $F_t$ depend on the force F applied to the stylus 12 principally by the horizontal displacement motor 44 operating through the horizontal rack 46 and pinion 48 gearing mechanism to cause the horizontal slide assembly 38 to urge stylus 12 radially inwardly during the eyeglass lens tracing process. The relative sizes of the forces $F_n$ and $F_t$ will depend on the tracing rate, including the rate of rotation that stylus 12 undergoes as it traces the exterior surface 75 of the lens or lens pattern 78. The forces $F_n$ and $F_t$ also depend on the peripheral shape and curves of the eyeglass lens 78 and the relative location of the rotation pivot point 70. In accordance with the preferred embodiment of the invention, it is preferable to control the magnitude of the force F applied to the stylus 12 during the tracing process through control of the horizontal motor 44.

Figure 4:
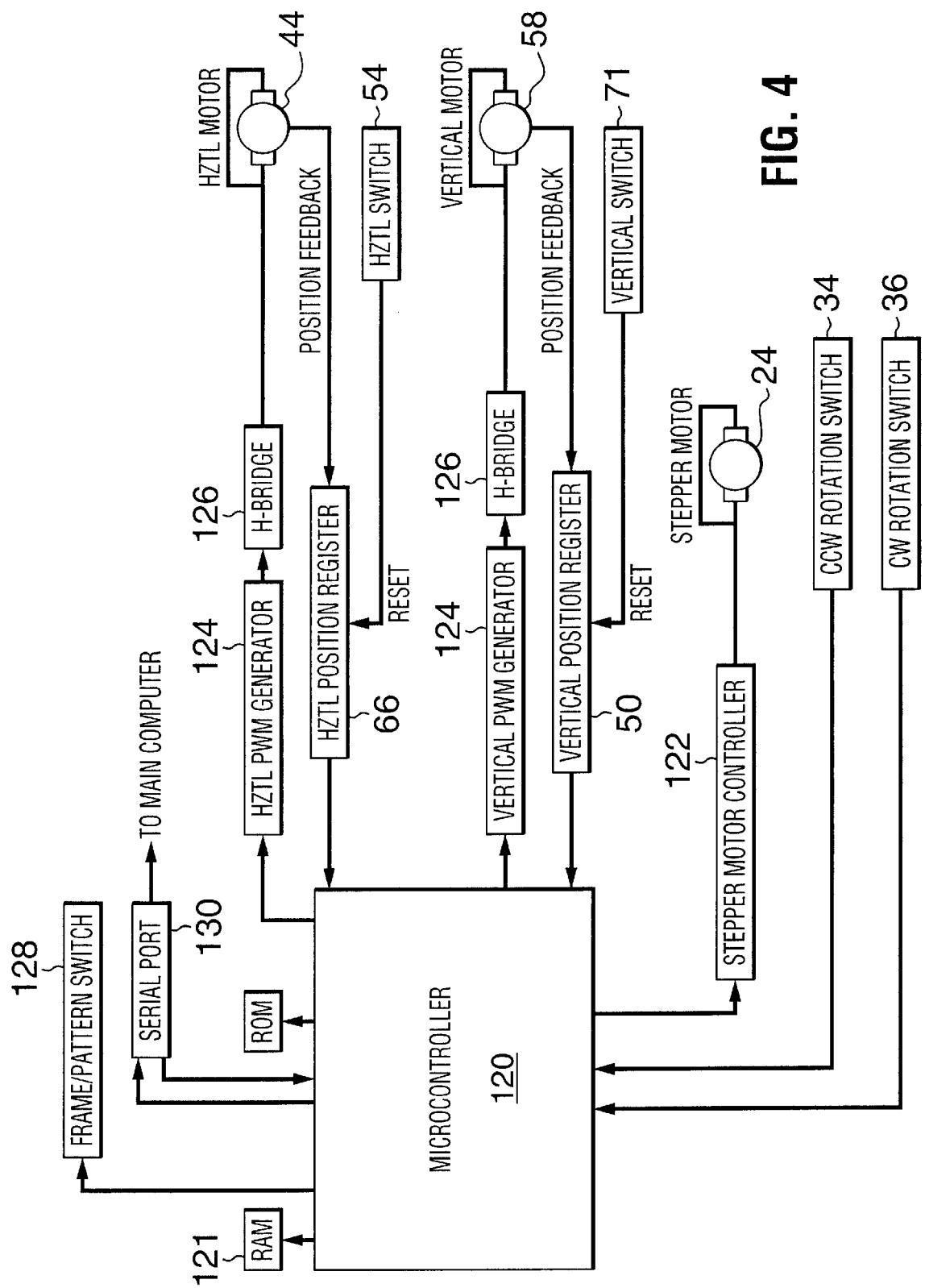
FIG. 4 is a functional block diagram of the stylus actuator apparatus.

FIG. 4 shows a functional block diagram of the elements of the tracer controller of the present invention. The tracer apparatus is controlled by a microcontroller 120 that is interconnected with the electrical motors 24, 44 and 58 and position sensing switches 34, 36, 54 and 71 of the tracer 10 to enable microcontroller 120 to control the electrical signalling and sense the electrical signalling associated with the stylus actuator apparatus 10. The maximum limits of the rotation of the turntable 20 where it comes into contact with the counter-clockwise limit switch 34 or clockwise limit switch 36 are supplied to microcontroller 120. Rotation of the turntable 20 about its axis of rotation 70 is effected by stepper motor 24 which has a stepper motor controller 122 which changes the voltage signalling produced by microcontroller 120 into suitable voltage and current signalling to drive stepper motor 24. Both the horizontal motor 44 and the vertical motor 58 are preferably core-less DC motors which can be controlled by microcontroller 120 by means of a suitable driver circuit. For example, a pulse width modulation (PWM) generator 124 producing signalling to drive an H bridge 126. The output of H bridge 126 is an electrical current and voltage to provide a power input to the motor 44 to control the torque or change the rotational displacement of the horizontal motor 44 depending on the commands produced by microcontroller 120. Similarly, a pulse width modulation (PWM) generator 124 produces signalling to drive H bridge 126 the output of which provides a power input to the vertical motor 58 to control the torque or change the rotational displacement of the vertical motor 58 depending on the commands produced by microcontroller 120. The microcontroller 120 has a frame/pattern switch 128 to select between outward urging of stylus 12 to trace a frame or inward urging to trace a lens or pattern. Also, the controller has a communications port, such as a serial port 130, to communicate the tracing results or other information to another computer for further processing or to receive commands, such as a command to commence tracing.

Figure 5:
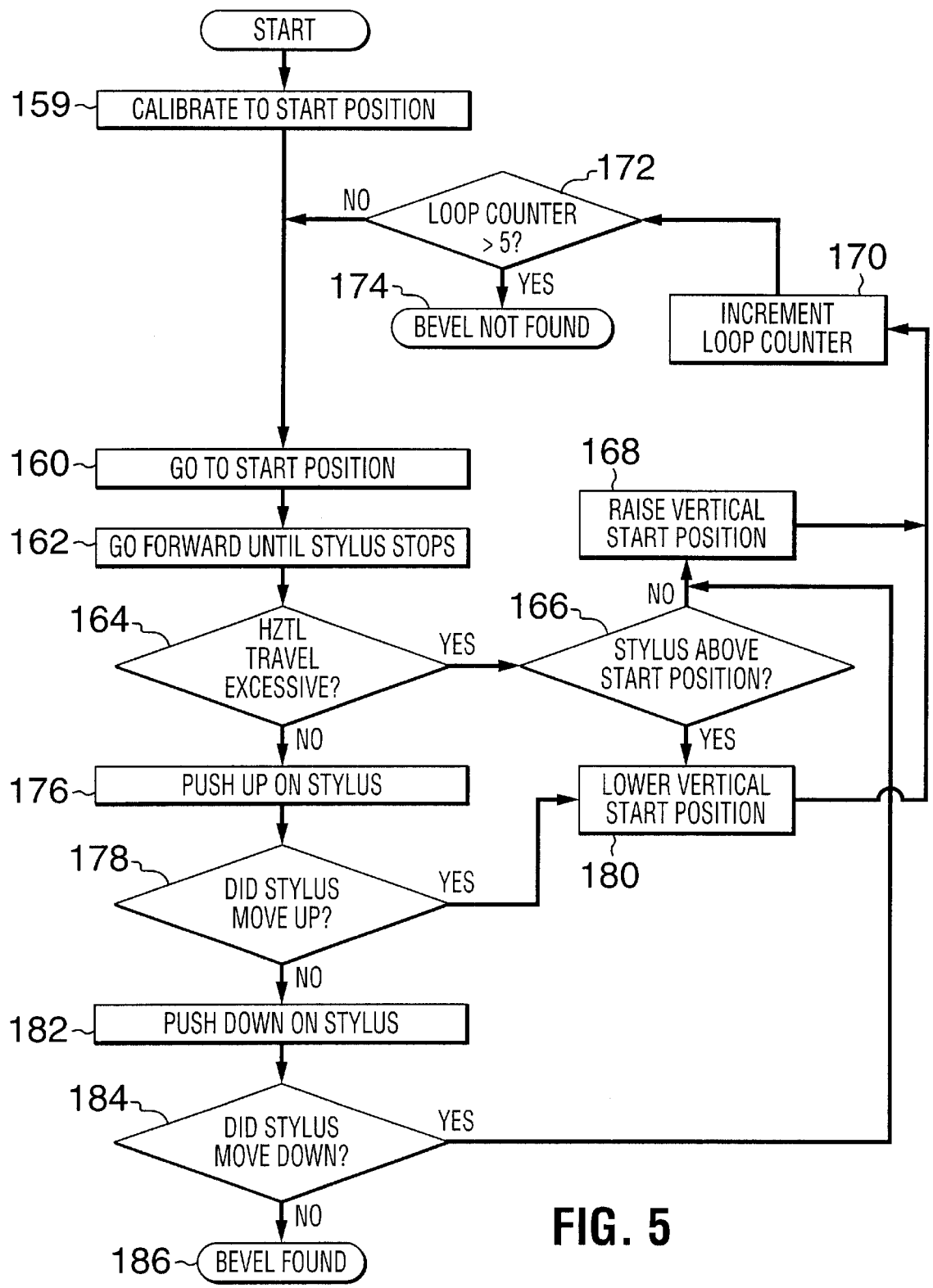
FIG. 5 is a flow chart of a preferred vertical positioning stylus control algorithm.

FIG. 5 shows a flowchart representative of the process for controlling the vertical movement of the stylus 12 to locate the stylus end point 14 within an eyeglass frame bevel. The stylus 12 has a mass which is counteracted on by a torque produced by vertical motor 58 to produce a "weightless" effect whereby any external vertical force applied to stylus 12 will cause it to move in the direction of the applied force. The amount of torque to be applied by vertical motor 58 is determined in the calibration process 159. In the calibration process, vertical motor rotates to position stylus 12 to an end point being arbitrary height from its home or lowest vertical position. At the rest point, varying torque is applied by vertical drive motor 58 by microcontroller 120 in the manner described with reference to FIG. 4 and the vertical movement of stylus 12 for the varying torque is monitored by the microcontroller 120. The torque value which produces no vertical movement of the stylus 12 is recorded by microcontroller 120, for example, in RAM 121, and may be referred to as the weightless torque. The stylus start vertical position variable is then set to a value corresponding approximately the mid-point of vertical travel of stylus 12, all as indicated in process box 159.

The process starts by positioning the stylus to the start position as indicated by process box 160. The stylus 12 is maintained in its vertical position by application of the calibrated weightless torque. The horizontal actuator motor 44 is operated to urge the stylus 12 radially outwardly and horizontal position information is obtained from the horizontal encoder until horizontal movement of the stylus ceases as indicated by process box 162. Once horizontal movement of the stylus has stopped, the stylus end location is tested in decision box 164. If the horizontal travel was excessive, the stylus vertical position is compared to the start position in decision box 166. If the stylus "just missed" the eyeglass frame above or below, then the "weightless" stylus will have been "forced" down or "forced" up to clear the eyeglass frame. If the stylus was not above the start position, that is, the stylus was not "forced" up to clear the eyeglass frame, the "N" exit of the decision box 166 will be taken and the process of box 168 will be performed. In process box 168, the variable representing the stylus vertical start position is raised or is incremented. Next, a loop counter is incremented as shown in process box 170. When the loop counter exceeds a predetermined threshold, such as 5 in decision box 172, further seeking of the bevel is discontinued and the seek bevel process stops. When the loop counter exceeds the predetermined threshold, the process exits the decision box 172 via the "Y" exit and performs "bevel not found" exit as indicated in termination block 174. When the loop counter is below the predetermined threshold, the "N" exit of decision box 172 is taken and processing continues at process box 160. At process box 160, the stylus is retracted horizontally and the vertical position of the stylus at the start location corresponding to the new stylus vertical start position variable is obtained through process box 160. Once the start position is obtained, processing as per process box 162 commences and, again, the stylus is urged to go forward until it stops. In the event that the horizontal travel of the stylus in a successive loop is not excessive, as tested in decision box 164, then process box 176 is executed causing the stylus to be urged upward. The vertical position of the stylus is read and compared in decision box 178. If the stylus did move up, that is an indication that the end point 14 of the stylus is not in the bevel and the start position of the stylus, by decreasing the stylus vertical start position variable, is lowered as indicated by process box 180. If the stylus does not move up as tested at the test performed at decision box 178, then process box 182 is performed which activates the vertical actuator to push down on the stylus. The position of the stylus after the push down operation is obtained and compared in decision box 184. If there was no change in the vertical position of the stylus then the bevel is found as indicated and the routine exits via the termination box "bevel found" labelled 186. If the stylus does move down, then the decision box 184 exits to process 168 which causes the vertical start position of the stylus to be increased and the loop is processed again.

Figure 6:
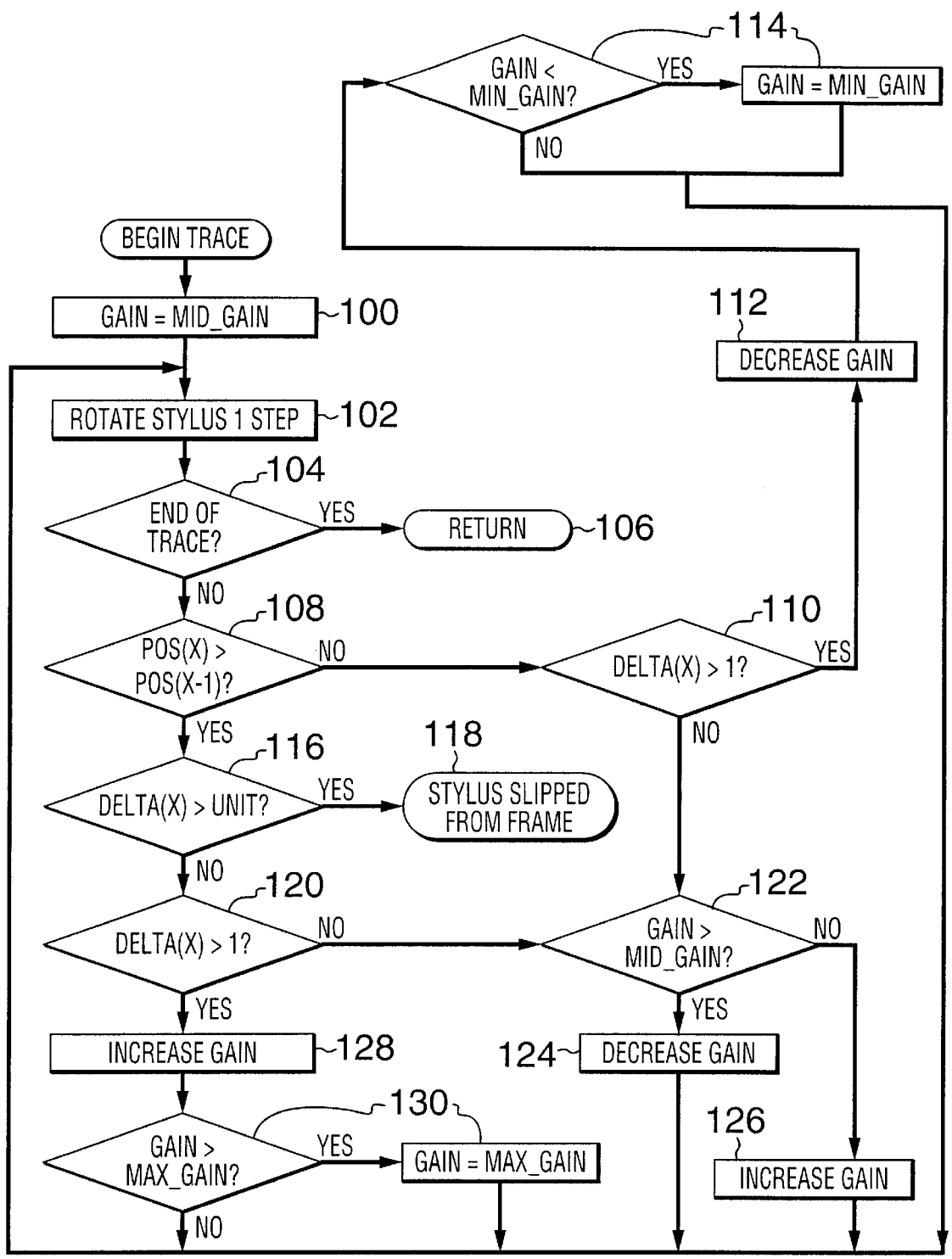
FIG. 6 is a flow chart of a preferred control algorithm for horizontal positioning the tracing stylus.

FIG. 6 shows a flow chart of an algorithm to control the force F to be applied to the stylus 12 by dynamically changing the drive parameters controlling the operation of the horizontal motor 58. The torque produced by the horizontal motor 58 is represented in the flow chart by the parameter GAIN which corresponds to the force F applied to the stylus 12. At the commencement of a trace, the GAIN parameter is set to a middle point value depicted as MID-GAIN in the process box 100. The microcontroller 120 advances the turntable 20 through one discrete rotation which is effected by signalling stepper motor controller 122 to cause stepper motor 24 to advance the stylus one step. This process is shown by process box 102. As will be understood, the stylus rotation of one step can correspond to one or more steps of actuation of stepper motor 24. The status of the rotation limit switch 36 or 34 (depending on the direction of rotation of the trace) is checked to determine if the end of a trace has been reached as indicated by decision box 104. If the end of trace has been reached, the trace is complete and the routine is exited as shown by process exit box 106. If the end of the trace has not been reached, the horizontal position of the stylus is read from the horizontal position register 66 to determine if the new position POS(x) is greater than the previous position POS(x-1) as shown in decision box 108. If the change in position is not positive, then the N exit from the decision box 108 is taken and the change in x is next compared to a constant value (as for example 1) as shown in the decision box 110. Where the change in x was greater than the constant, then Y exit of decision box 110 is taken and the GAIN parameter is decreased to decrease the force F being applied to the stylus. The gain decrease is shown by the DECREASE GAIN process box 112. Thus when the rate of change of the stylus is decreasing, the force F applied to the stylus decreases. If the decrease reaches the minimum force threshold, then the gain is set to the minimum gain (as depicted by the assignment process GAIN=MIN–GAIN) to ensure that a minimum force F is always applied to the stylus. This check and set process are shown by the decision box and process box 114 of the Figure. If the increase in the horizontal position was positive, then the change in the horizontal position of the stylus is compared to determine if it exceeds a predefined limit as shown by process box 116. If the change in the horizontal displacement of the stylus tip exceeds the limit, then the process concludes that the stylus has slipped from the frame as indicated by process termination box 118 and an error exit from the logic flow is taken. An error exit may result in an error indication being produced for the operator of the tracer apparatus such as producing audible error tones or display of a message on a display device.

The change in x is compared to 1 as depicted in decision box 120. If the change in x was not greater than 1, then the current gain setting is compared to the midpoint gain setting as shown in decision box 122. If the current gain setting is greater than the midpoint gain setting, then the gain (applied to produce the force F on the stylus) is decreased as shown by process box 24. On the other hand, if the gain applied is not greater than the midpoint, then process box 26 is executed and the gain or force applied to the stylus tip is increased as shown by process box 126.

If the change in x was greater than 1, then process box 128 is executed and the gain (corresponding to the force applied to the stylus tip) is increased. The decision box and process box labelled 130 are executed. If the increase in gain results in the gain setting exceeding the maximum allowable gain, then the gain is set to the maximum gain as depicted by the assignment process GAIN=MAX–GAIN.

In this fashion the force applied to the stylus tip is varied between a user settable minimum gain value (MIN-GAIN) and a user settable maximum gain value (MAX-GAIN) by evaluating the horizontal position of the stylus tip from one measurement to the next. When very little change in x is detected, then the gain will iterate its way back to the MID-GAIN value. For example, if tracing a circle with the axis of rotation at the centre of the circle, very little change in x would be detected and, therefore, the gain would be iterated toward the MID-GAIN value. Where the horizontal displacement of the stylus tip from one measurement point to the next calls for an increase in force to be applied to permit the stylus tip to track the interior surface of the eyeglass frame 74, then the force applied to the stylus tip is correspondingly increased to reflect the path traced by the stylus tip.

Figure 7:
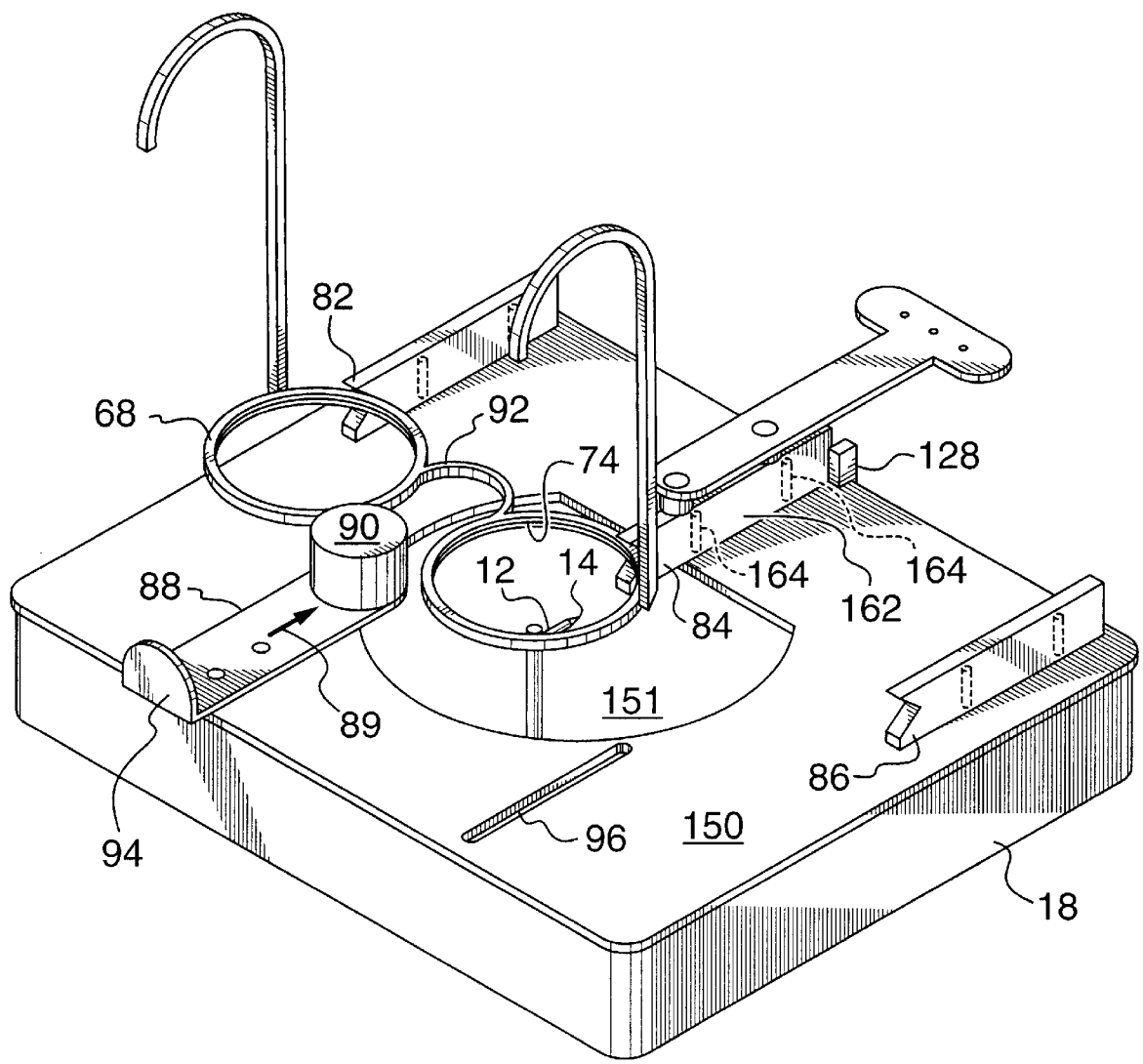
FIG. 7 is a perspective view of a frame and lens mount with eyeglass frame mounted therein.

FIG. 7 shows a perspective view of apparatus to hold an eyeglass frame for measurement. A work surface 150 is connected to base 18 of the stylus actuator apparatus to provide a stationary base for holding eyeglass frames, lenses and patterns for tracing. FIG. 7 shows an eyeglass frame 68 held between opposed v-grove holders 82 and 84 where stylus 12 is able to access the right lens aperture of eyeglass frame 68. Another v-groove holder 86 is provided to hold eyeglass frame 68 when tracing the other (left) lens aperture of the eyeglass frame 68. A frame bridge engagement means 88 is slidably disposed above work surface 150. When the upper portion of the eyeglass frame 68 is fitted to the v-groove holders 82 and 84, the eyeglass frame bridge engagement means 88 is pushed forward in the direction of arrow 89 until stop 90 engages the eyeglass frame bridge 92. The eyeglass frame bridge engagement means 88 has a tab 94 which can be grasped by an operator to urge the eyeglass bridge engagement means forward in the direction of arrow 89 to engage the glasses or rearward in the opposite direction of arrow 89 to release the eyeglass frames 68 from the holder. When the eyeglass frames 68 are engaged between opposed eyeglass frame bridge engagement means 88 and v-groove holders 82 and 84 (or v-groove holders 84 and 86 when the opposite left lens aperture is being traced) stylus 12 is urged into engagement with the eyeglass frame 68 whereby the stylus end point 14 engages the v-groove of the eyeglass frame.

Stop 90 may be formed from metal or an elastomeric material such a rubber to grippingly engage the eyeglass frame bridge 92 over the nasal rests (not shown) which are commonly provided in eyeglass frames to contact the nasal bridge of a user when the eyeglasses are being worn. Slide 88 is in functional contact with work surface 150 resulting in a firm engagement of eyeglass frame 68 between stop 90 and v-grooves 82 and 84.

In the preferred embodiment, frame bridge engagement means 88 is removable from work surface 150 whereby it can be placed in the right eye lens aperture tracing position, as shown in the Figure, or in the opposite guide slot 96 to trace the left lens aperture.

Figure 8:
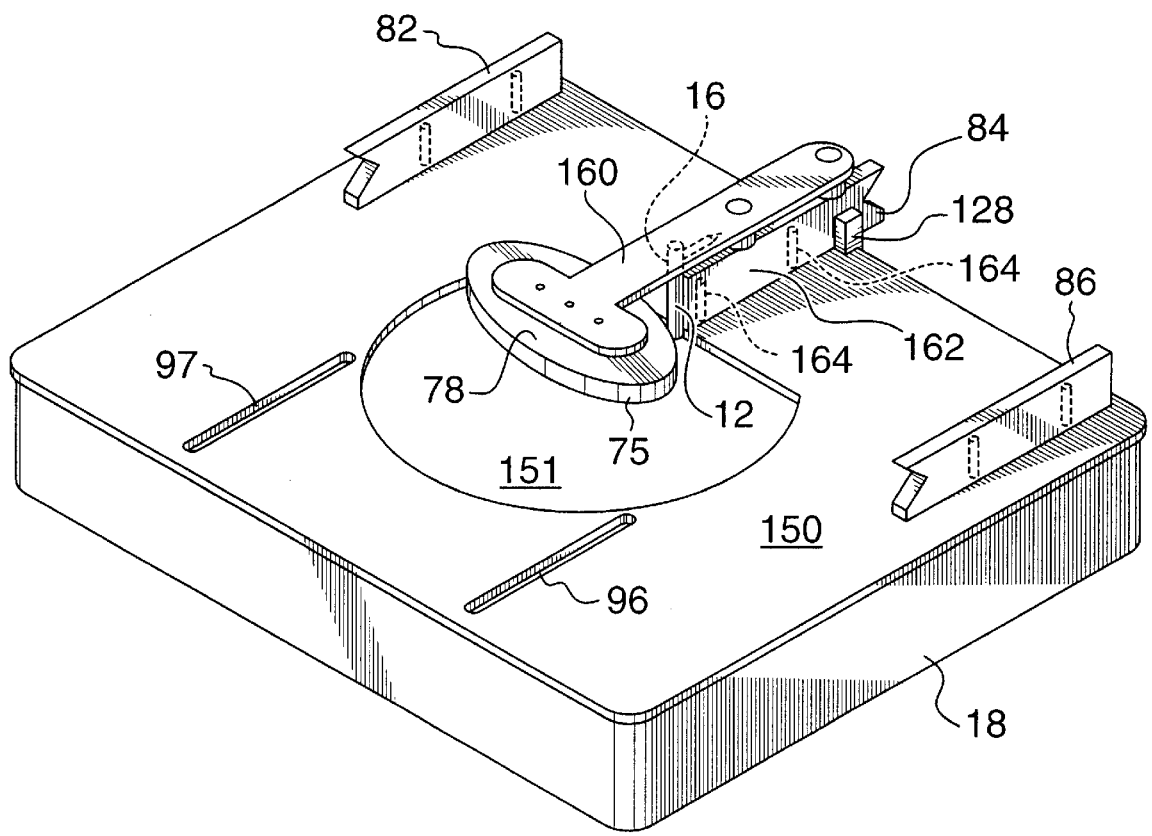
FIG. 8 is a perspective view of a lens mounted therein.

FIG. 8 shows a perspective view of apparatus to hold a lens or lens pattern 78 for tracing. A work surface 150 is provided on the upper portion of a box-like assembly adapted for mounting on or attachment to base 18 of the stylus actuator apparatus 10. Work surface 150 forms an aperture 151 through which stylus 12 may pass. The eyeglass lens or pattern 78 is releasably attached to a holder 160 adapted to retain the eyeglass lens or pattern 78 disposed above aperture 150 to enable stylus 12 to circumferentially traverse the eyeglass lens or pattern 78. Stylus 12 is oriented to enable the backside 16 of the stylus to come into contact with the peripheral edge of the eyeglass lens or pattern 78 to be measured. Eyeglass lens or pattern 78 is retained on holder 160 by suitable means such as double-sided tape.

In the preferred embodiment of the invention, holder 160 is attached to the apparatus forming the v-groove holder 84 permitting the combined apparatus 160 and 84 to be selectively positioned in a reversible fashion on a work surface 150 in the orientation for eyeglass lens or pattern measurement as shown in FIG. 8 or in the position for eyeglass frame tracing as shown in FIG. 7. For this purpose, body 162 is provided with pins 164 that mate body 162 to work surface 150. A frame/pattern switch 128 is activated to signal the orientation of body 162 on work surface 150. The frame/pattern switch 166 is in activating contact with body 162 as shown in FIG. 8 when the holder is oriented to trace an eyeglass lens or pattern 78. In the orientation of FIG. 7, switch 166 is no longer in proximity to body 162 thereby providing signalling that the holder is configured to measure eyeglass frames.

Now that the invention has been described, numerous modifications and substitutions will occur to those skilled in the art which are intended to be within the spirit and scope of the invention as defined in the claims appended hereto.

I claim:

1. An apparatus to trace the perimeter shape of an eyeglass frame or lens comprising:
   (i) a base including holding means;
   (ii) a stylus;
   (iii) horizontal movement means operable to bias said stylus horizontally relative to said base with a force that is increased with increasing speed of travel in the direction of the bias and decreased to not less than a minimum force with decreasing speed of travel or with increasing speed of travel in opposite direction to the bias;
   (iv) horizontal movement encoder means to provide signalling representative of relative horizontal displacement between said stylus and said base;
   (v) vertical movement means operable to move said stylus vertically relative to said base;
   (vi) vertical movement encoder means to provide signalling representative of relative vertical displacement between said stylus and said base;
   (vii) rotation means operable to rotate said stylus relative to said base about a pivot point; and
   (viii) rotation encoder means to provide signalling representative of relative rotation between said stylus and said base;
   whereby said stylus can trace the perimeter of an eyeglass frame or lens held by said holding means.

2. The apparatus of claim 1 wherein said bias is directed outwardly from said pivot point, whereby tracing of an eyeglass frame is facilitated.

3. The apparatus of claim 1 wherein said bias is directed inwardly toward said pivot point whereby tracing of an eyeglass lens is facilitated.

4. The apparatus of claim 1 wherein said stylus comprises an elongate element generally vertically extending and includes a pointed projection extending transversely therefrom, said pointed projection adapted to engage a lens seating groove of an eyeglass frame.

5. The apparatus of claim 1 wherein said stylus has a substantially circular cross section opposed to said pointed projection adapted to contact the circumference of an eyeglass lens.

6. The apparatus of claim 1 wherein said horizontal movement means comprises a core-less DC motor.

7. The apparatus of claim 1 wherein said vertical movement means comprises a core-less DC motor.

8. The apparatus of claim 1 wherein said rotation means comprises a stepper motor.

9. An apparatus to trace the perimeter shape of an eyeglass object, namely a frame or a lens, comprising:
   (i) a base;
   (ii) means to hold an eyeglass object to said base;
   (ii) a stylus to contact said eyeglass object;
   (iii) actuator means operable to displace said stylus with respect to said base in three directions, namely rotationally about a pivot point, horizontally and vertically;
   (iv) encoder means to produce signalling representative of the rotational, horizontal and vertical displacement of said stylus with respect to said base; and
   (v) control means to activate said actuator means to control the rotational, horizontal and vertical displacement of said stylus to bias said stylus in a horizontal direction with a force that is increased with increasing horizontal speed of travel of said stylus in the direction of the bias and decreased to not less than a minimum force with decreasing horizontal speed of travel of said stylus or with increasing speed of travel in opposite direction to the bias;
   whereby said stylus is displaced to trace the perimeter of said eyeglass object and the position of said stylus during said trace is signalled by said encoder means.

10. The apparatus of claim 9 wherein said means to hold an eyeglass frame eyeglass object comprises:

(i) a work surface disposed above said base;

(ii) a pair of co-extending v-groove holder elements depending from said work surface, the v-groove holder elements each forming a v-shaped recess extending inwardly thereinto; and (iii) a stop opposed to said v-groove holder elements operable between an engaged position and a released position;

whereby, an eyeglass frame positioned into said v-shaped recess of said pair of co-extending v-groove holder elements is releasably retained therein by said stop when in said engaged positon.

11. The apparatus of claim 9 wherein said bias is directed outwardly from said pivot point, whereby tracing of an eyeglass frame is facilitated.

12. The apparatus of claim 9 wherein said bias is directed inwardly toward said pivot point whereby tracing of an eyeglass lens is facilitated.

13. The apparatus of claim 9 wherein said stylus comprises an elongate element generally vertically extending and includes a pointed projection extending transversely therefrom, said pointed projection adapted to engage a lens seating groove of an eyeglass frame.

14. The apparatus of claim 9 wherein said stylus has a substantially circular cross section opposed to said pointed projection adapted to contact the circumference of an eyeglass lens.

15. The apparatus of claim 9 wherein said actuator means includes a core-less DC motor for horizontal displacement.

16. The apparatus of claim 9 wherein said actuator means includes a core-less DC motor for vertical displacement.

17. The apparatus of claim 9 wherein said actuator means includes a stepper motor for rotational displacement.

18. A method of tracing the perimeter shape of an eyeglass frame or lens comprising the steps of:

(i) releasably securing an eyeglass object, namely a frame or lens, to a base;

(ii) biasing a stylus into contact with said eyeglass object that is increased with increasing speed of horizontal travel in the direction of the bias and is decreased to not less than a minimum bias with decreasing speed of horizontal travel of said stylus or with increasing speed of travel in opposite direction to the bias;

(iii) rotating said stylus substantially one revolution about a pivot point with respect to said base; and (iv) encoding the vertical horizontal and rotational displacement of said stylus at discreet intervals during said revolution.

19. A method for seating alignment of apparatus to trace the perimeter shape of an eyeglass frame that includes a base, means to hold an eyeglass frame to said base, a stylus having a pointed projection to contact said eyeglass frame, actuator means operable to displace said stylus with respect to said base in at least two directions, namely, horizontally and vertically, comprising attempting seating alignment until seating of said pointed projection of said stylus in a lens seating groove of said eyeglass frame occurs or a predetermined number of attempts were not successful, each attempt including the steps of:

(i) homing the stylus to a start position at a selected vertical displacement location and horizontal displacement location;

(ii) moving the stylus horizontally outwardly to an end position; and (iii) adjusting the vertical displacement location of the start position of the stylus by determining the change in vertical displacement of the stylus at the end position and, for an increase in vertical displacement of the stylus, decreasing the vertical displacement location of the start position of the stylus; but for no increase in vertical displacement of the stylus, increasing the vertical displacement location of the start position of the stylus.

* * * * *